(12) United States Patent
Kastinger et al.

(10) Patent No.: US 6,657,329 B2
(45) Date of Patent: Dec. 2, 2003

(54) UNIPOLAR TRANSVERSE FLUX MACHINE

(75) Inventors: Guenter Kastinger, Gaggenau-Sulzbach (DE); Anton Paweletz, Fellbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/019,590

(22) PCT Filed: May 4, 2001

(86) PCT No.: PCT/DE01/01665
§ 371 (c)(1),
(2), (4) Date: Mar. 15, 2002

(87) PCT Pub. No.: WO01/86785
PCT Pub. Date: Nov. 15, 2001

(65) Prior Publication Data
US 2002/0113520 A1 Aug. 22, 2002

(30) Foreign Application Priority Data
May 5, 2000 (DE) .......................................... 100 21 914
Aug. 12, 2000 (DE) .......................................... 100 39 466

(51) Int. Cl.⁷ .............................................. H02K 21/14
(52) U.S. Cl. ..................... 310/49 R; 310/216; 310/254; 310/261
(58) Field of Search ....................... 310/49 R, 216–218, 310/254, 178, 179, 182–183, 261

(56) References Cited

U.S. PATENT DOCUMENTS

| | | | | |
|---|---|---|---|---|
| 4,127,802 A | * | 11/1978 | Johnson | 310/49 R |
| 4,255,696 A | * | 3/1981 | Field, II | 310/49 R |
| 4,423,343 A | * | 12/1983 | Field, II | 310/49 R |
| 5,747,898 A | | 5/1998 | Yoshida et al. | 310/49 R |
| 6,304,010 B1 | * | 10/2001 | Sugiura | 310/49 R |

FOREIGN PATENT DOCUMENTS

| | | |
|---|---|---|
| DE | 36 02 687 A | 8/1987 |
| DE | 196 14 862 A | 11/1997 |
| EP | 0 544 200 A1 | 6/1993 |
| EP | 0 942 517 A | 9/1999 |
| JP | 60131067 | * 7/1985 |
| JP | 60176460 | * 9/1989 |
| WO | 97 42699 A | 11/1997 |

OTHER PUBLICATIONS

Michael Bork: "Entwicklung Und Optimierung Einer Fertigungsgerechten. . . ", Shaker Verlag, Aachen XP 002177923, pp. 8, 14., Jan. 1997.

* cited by examiner

*Primary Examiner*—Tran Nguyen
(74) *Attorney, Agent, or Firm*—Michael J. Striker

(57) ABSTRACT

In a unipolar transverse flux machine, to achieve a modular construction, which is favorable from a production standpoint, the stator (11) and the rotor (12) have an equal number of identical stator modules (14) and rotor modules (15); the rotor modules (15) are firmly seated, in alignment with one another, on the rotor shaft (13), and the stator modules (14) are rotated by a rotational angle from one another in the housing (10). When there are two stator modules (14), the rotational angle is 90° electrically, and when there are m stator modules (14), the rotational angle is 360°/m electrically, where m is an integer and is greater than 2. Each stator module (14) has an annular coil (23), disposed coaxially to the rotor axis (19), and U-shaped stator yokes (24) that fit over the annular coil, along with short-circuit elements (25) disposed between the stator yokes. Each rotor module (15) comprises two rotor rings (16, 17) with teeth on the outside, and between them a permanent-magnet ring (18), magnetized unipolarly in the direction of the rotor axis (19).

26 Claims, 7 Drawing Sheets

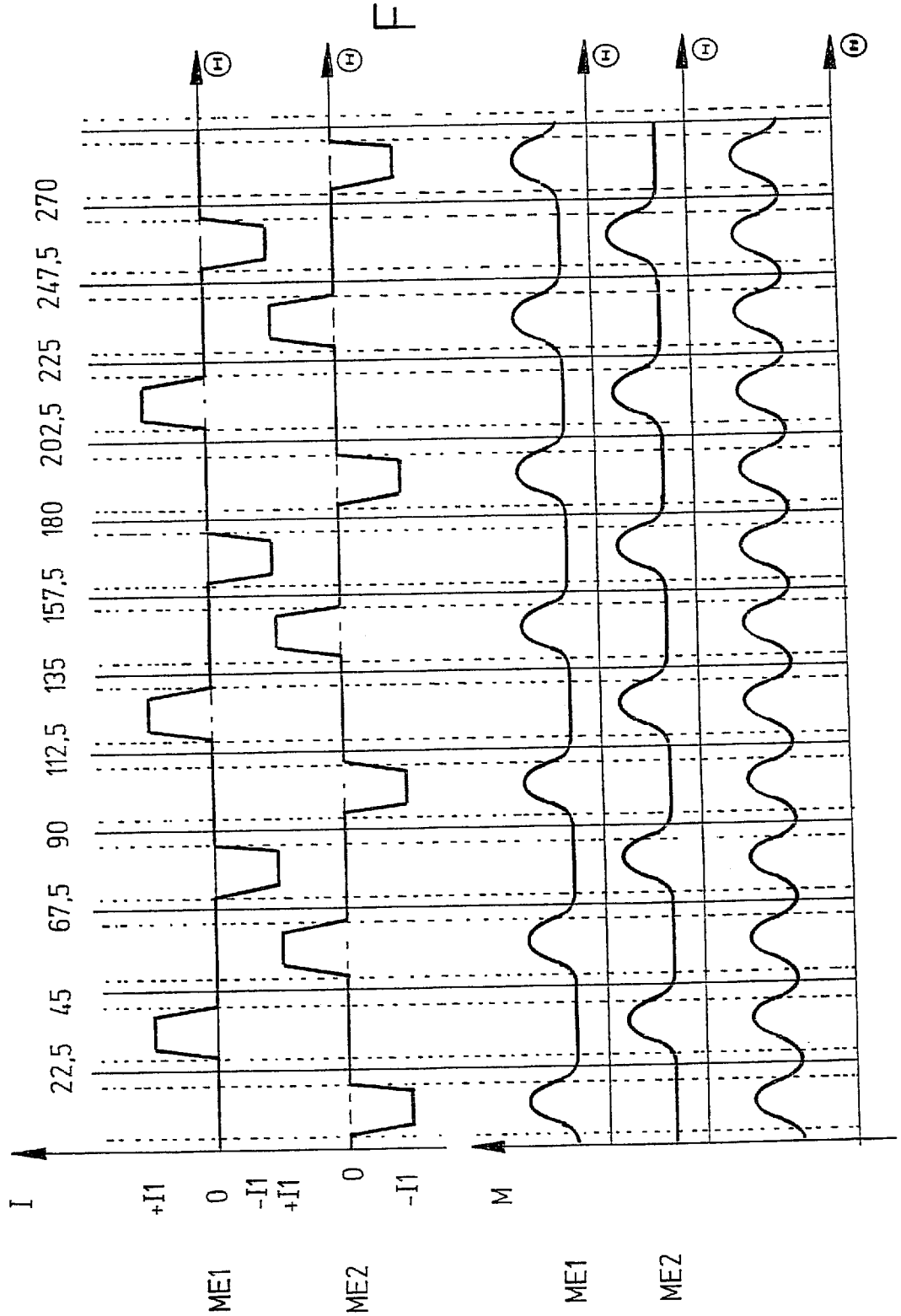

UNIPOLAR TRANSVERSE FLUX MACHINE

BACKGROUND OF THE INVENTION

The present invention is based on a unipolar transverse flux machine.

In one known machine of this type (European Patent Disclosure EP 0 544 200 A1), where it is called a hybrid synchronous machine with transverse magnetic flux, the toothing of each rotor ring has one row of teeth extending over the outer circumference of the rotor ring, remote from the rotor axis, and one row of teeth extending on the inside circumference, toward the rotor axis, of the rotor ring, and the two rows of teeth have the same tooth pitch. The rows of teeth on each rotor ring are offset from one another by one tooth pitch. The yoke pitch on the stator corresponds to the tooth pitch of an inner or outer row of teeth, so that one outer tooth of one rotor ring and one inner tooth of the other rotor ring are always simultaneously located beneath one stator yoke. The two rotor modules, each comprising two rotor rings with axially unipolarly magnetized ring magnets located between them, are firmly fastened to the sides, remote from one another in the axial direction of the rotor, of a rotor body that is braced on the housing via rotary bearings. The stator yokes of each stator module that are received by the housing are embodied in the form of a U, and with their yoke legs oriented parallel to the rotor axis, they fit over the inner and outer rows of teeth of the two rotor rings of the rotor modules. The circular-annular coil, disposed concentrically to the rotor axis, in each stator module passes through the stator yokes at the base of the yoke, or in other words is located in the region between the annular face, pointing away from the rotor body, of the outer rotor ring and the crossbar of the stator yokes.

Transverse flux machines with permanent magnet excitation are known from the literature, such as the dissertation by Michael Bork, *Entwicklung und Optimierung einer fertigungsgerechten Transversalflußmaschine* [Developing and Optimizing a Transverse Flux Machine to Meet Production Requirements], Dissertation 82, RWTH Aachen, Shaker Verlag Aachen, Germany, 1997, pages 8 ff. The circularly wound stator winding is surrounded by U-shaped soft iron yokes, which are disposed in the direction of rotation at the spacing of twice the pole pitch. The open ends of these U-shaped yokes are aimed at the air gap between the stator and rotor and form the poles of the stator. Facing them, permanent-magnet chips are disposed in such a way that the two chips that face the poles of a stator yoke have the opposite polarity. To short-circuit the permanent magnets, which in the rotor rotation are intermittently located between the poles of the stator and have no ferromagnetic short circuit, short-circuit elements are disposed in the stator. The short-circuit elements prevent the flux of the permanent magnets from being scattered along the yoke legs and the annular coil and prevent the effectiveness of the stator flux concatenation from being reduced by attenuation of the stator flux. Hence the short-circuit elements bring about a marked increase in the power of the machine.

SUMMARY OF THE INVENTION

The unipolar transverse flux machine of the invention has the advantage of simple modular construction, with which any desired number of lanes of the machine can be achieved by adding or deleting identically embodied stator and rotor units or in other words can be put together in modular fashion. As the number of module units, each composed of one stator module and one rotor module, increases, the concentricity of the machine improves, and an initially intermittent behavior of the machine changes over to continuous concentricity, without ripples in the course of the moment. Since the total moment of the machine is the sum of the moment components of the module units, the total moment of the machine can be adapted easily to existing requirements, without problems.

Compared to conventional transverse flux machines, the unipolar transverse flux machine of the invention has the advantage of a simple, unipolar magnetization of the rotor and of simple construction, by the avoidance of a great number of individual permanent magnets. The flux generated in the stator winding no longer passes primarily through the permanent magnets but instead through the teeth of the rotor rings, and it closes by way of the short-circuit elements, so that better utilization of the teeth is achieved. The result is better conditions for flux guidance, and the total amount of stray flux is reduced. In addition, the short-circuit elements serve to create an opposite pole in the stator, so that the same number of poles is obtained in both the stator and the rotor. The annular coil, whose outward-oriented portions between the stator yokes have a relatively large surface area, can be readily cooled, so that high current densities in the annular coil are attainable.

By means of the provisions recited in the other claims, advantageous refinements of and improvements to the unipolar transverse flux machine defined by claim 1 are possible.

In one advantageous embodiment of the invention, the short-circuit elements are in the form of a C, with two short legs each radially facing a rotor ring and with one crossbar, connecting the legs to one another, that extends parallel to the rotor axis on the inside, toward the rotor axis, of the annular coil, which is embodied circularly.

In an alternative embodiment of the invention, the short-circuit elements are embodied identically to the stator yokes and are in the form of a U, each with two long legs radially facing a rotor ring and with one crossbar connecting these long legs and extending parallel to the rotor axis. The annular coil of the stator module is shaped in meandering fashion, point-symmetrically to the rotor axis in the radial plane, in such a way that in successive alternation the annular coil extends through the space between the legs of a stator yoke and beyond the outside, remote from the rotor axis, of a crossbar of a short-circuit element. This has the advantage that the same tool can be used for both the yokes and the short-circuit elements, so that with the same tool, higher production can be achieved. The annular coil can be put into the meandering shape relatively simply.

In an advantageous embodiment of the invention, each stator module is received in a housing that comprises two half shells, which are embodied identically and placed on one another mirror-symmetrically and which have axially aligned radial grooves for insertion of the stator yokes and the short-circuit elements and also have indentations, for receiving the annular coil, that face one another mirror-symmetrically and are oriented concentrically to the housing axis. As a result, a self-supporting stator construction is achieved with identical components and simple joining technology, a construction that is maximally well suited to highly automated large-scale mass production. The self-supporting and self-locking function with exact positioning of the stator module elements (stator yokes, short-circuit elements, annular coil) is not limited to merely the individual stator module but instead is also used for positioning other stator modules relative to one another and for transmitting force and moment.

In a preferred embodiment of the invention, each half shell has a gridlike structure with an inner ring and an outer ring concentric to it. Both rings are integrally joined to one another by radial ribs. The radial grooves that receive the short-circuit elements are placed in the inner ring, while the radial grooves that receive the stator yokes extend across the inner ring, radial rib, and outer ring. This grid structure with openings located between the radial ribs makes an intensive heat transfer possible from the active magnetic and electrical stator elements to the cooling medium, which is air, and thus makes an intensive heat dissipation to the environment possible.

In an advantageous embodiment of the invention, the stator yokes and the radial grooves that receive them are adapted to one another such that when the stator yokes have been inserted into the radial grooves, the two half shells are fixed against one another radially and axially nondisplaceably. Thus the stator yokes have two functions, first that of magnetic flux guidance and second that of a mechanical clamp, which holds and correctly positions the half shell.

To achieve the mechanical clamp function, in an advantageous embodiment of the invention, the stator yokes, on both sides of their crossbar, each have a respective protruding hook, which when the stator yokes have been inserted into the radial grooves fits by positive engagement over one radial rib of the two half shells, on its back side remote from the radial groove.

In a multi-lane version of the unipolar transverse flux machine, in which the rotor modules are disposed in axial alignment on the rotor shaft and the stator modules are rotated from one another by a fixed angle, which with a two-lane embodiment amounts to 90° electrically and for an m-lane embodiment amounts to 360°/m electrically, where m>2, two spaced-apart radial recesses are made, from the outsides of the half shell that are remote from the radial grooves, in the annular portions of the outer ring, extending in the radial ribs, of the half shells, and the width of these radial recesses is equivalent in the circumferential direction to the width of the protruding hooks, while their radial depth is equivalent to the axial depth of the roots of the protruding hooks. For mirror-symmetrical placement of the two identical half shells on one another, the radial recess is disposed in the annular portion offset by the fixed angle from the following radial groove for a stator yoke, while the other radial recess is offset by the same fixed angle from the preceding radial groove for a stator yoke. The protruding hooks of the adjacent stator module protrude into one of these radial recesses per annular portion, and assure the requisite rotational angle offset between adjacent stator modules.

In an alternative embodiment of the multi-lane version, the stator modules are axially aligned, while the rotor modules are rotated from one another on the rotor shaft by the same fixed angle as defined above. In such an embodiment of the multi-lane machine, the above-described radial recesses in the outer ring are omitted, and the stator yokes of the stator modules located side by side in the axial direction are joined together in their crossbar region by axially extending bridges. On their outer side, the two outer stator yokes, of the joined-together stator yokes each have one hook protruding from the crossbar, which hook, when the stator yokes have been inserted into the radial grooves, fits over a radial rib of the two outer half shells on its back side remote from the radial groove. The stator yokes joined together, with the bridges located between them, are preferably embodied as one-piece stamped parts.

BRIEF DESCRIPTION OF THE DRAWING

The invention is described in further detail in the ensuing description in terms of exemplary embodiments shown in the drawing. Shown are:

FIG. 6, a graph showing the electrical current supply to the stator of the two module units of the two-lane unipolar transverse flux machine;

FIG. 7, one graph showing the course of moment in the two rotor modules and one graph showing the course of the total moment at the rotor shaft;

DESCRIPTION OF THE PREFERRED EMBODIMENTS

Figure 1:
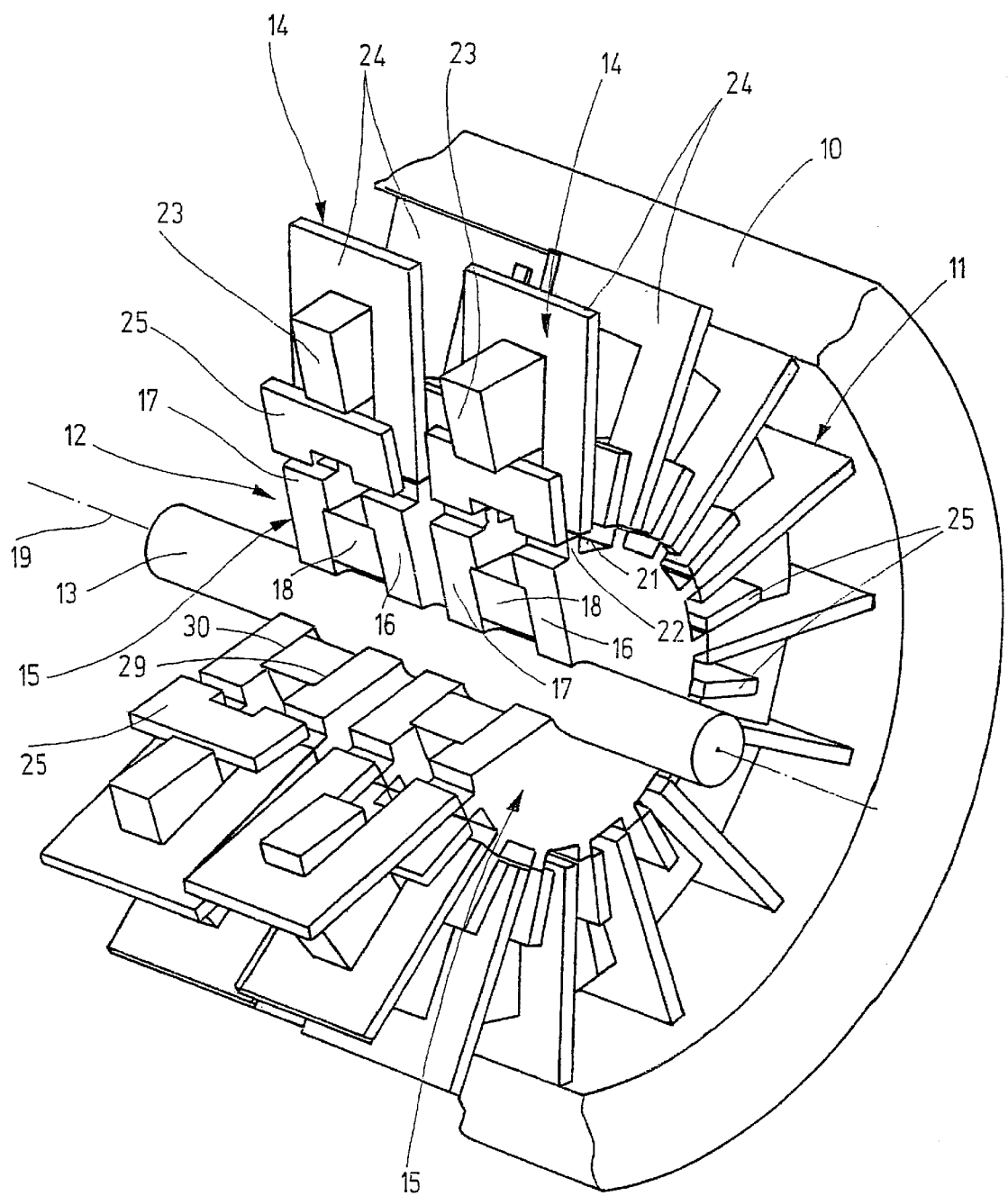
FIG. 1, a fragmentary perspective view of a two-lane, 32-pole unipolar transverse flux machine, partly shown schematically.

The unipolar transverse flux machine shown schematically in various views and sections in the drawing has a machine housing 10 with a stator 11 mounted on it as well as a rotor 12 revolving in the stator 11 and seated in a manner fixed against relative rotation on a rotor shaft 13 supported in the machine housing 10. The rotor 12 has a plurality of rotor modules 15, and the stator 11 has an equal number of stator modules 14. The rotor modules 15 are placed in axial succession directly on the rotor shaft 13 in a manner fixed against relative rotation, and the stator modules 14 are secured to the machine housing 10 in axial succession and in radial orientation to the associated rotor module 15. The number of module units, each including one stator module 14 and one rotor module 15, is determined by the number of lanes selected for the unipolar transverse flux machine, which in the exemplary embodiments described is two-laned and accordingly has two module units. However, it can be embodied with only a single lane or with three or more lanes. The stator modules 14 and rotor modules 15 and thus the module units are embodied identically, so that the unipolar transverse flux machine has a modular construction and can be adapted easily to existing requirements for power and torque by adding or subtracting module units.

Figure 3:
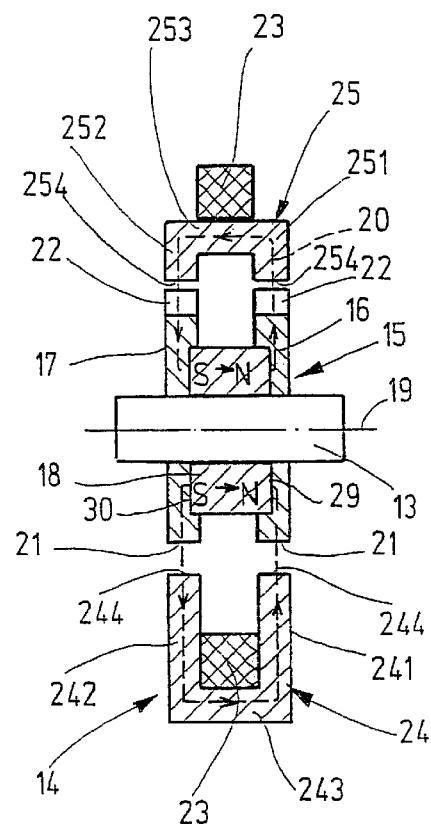
FIG. 3, a section taken along the line III—III of FIG. 2.

The rotor module 15 comprises two coaxial, toothed, ferromagnetic rotor rings 16, 17, which are seated on the rotor shaft 13 and between them fasten a permanent-magnet ring 18, which is magnetized unipolarly in the axial direction, that is, in the direction of the rotor axis or housing axis 19. In FIG. 3, the magnetization of the permanent-magnet ring 18 is shown as an example, and the magnetic flux 20 generated by the permanent-magnet ring 18 is represented by dashed lines. To optimize the total stray flux course and better utilize the permanent-magnet ring 18, the latter is received with its annular end faces, each in a respective central, axial indentation 29 and 30 in the side faces, toward one another, of the rotor rings 16, 17. Each rotor ring 16, 17 is toothed with a constant tooth pitch on its outer circumference remote from the rotor axis 19, so that the teeth 22, each separated from one another by a tooth gap 21, in the resultant row of teeth have the same spacing from one another in terms of the rotational angle. The teeth 22 on the rotor ring 16 and on the rotor ring 17 are axially aligned with one another. The rotor rings 16, 17, with the teeth 22 formed integrally on them, are laminated and are preferably assembled from identical sheet-metal stampings, which rest on one another in the axial direction.

The stator module 14, concentrically surrounding the rotor module 15 with radial spacing, has one annular coil 23, disposed coaxially to the rotor axis 19, along with U-shaped stator yokes 24 that fit over the annular coil 23. The likewise laminated stator yokes 24, assembled from stamped metal sheets into lamination packets, are fixed here to the machine housing 10 with a yoke pitch equivalent to the tooth pitch on the rotor module 15, so that they have the same spacing in terms of rotational angle from one another as the teeth 22 of the rotor rings 16, 17. The stator yokes 24 are disposed here in such a way that one leg 241 of each yoke is radially aligned with one rotor ring 16, while the other leg 242 of each yoke is aligned with the other rotor ring 17 of the associated rotor module; the free end faces 244, forming pole faces, of the legs 241, 242 of the yoke face the rotor ring 16 and 17, respectively, with radial gap spacing (see FIGS. 1 and 3). In the exemplary embodiment, the end faces 244 have an equal axial width to the rotor rings 16, 17. However, end faces 244 of the legs 241, 242 of the yoke that protrude axially past the rotor rings 16, 17 on one or both sides are also advantageous. One short-circuit element 25 is disposed between successive stator yokes 24 in the direction of rotation of the rotor 12. The likewise laminated short-circuit elements 25, produced as lamination packets, have the same spacing in terms of rotational angle from one another as the stator yokes 24 and are offset from the stator yokes 24 by half the yoke pitch, or a pole pitch τ. The short-circuit elements 25 extend parallel to the rotor axis 19 to beyond both rotor rings 16, 17, and face the rotor rings with the same radial gap spacing as the stator yokes 24. The width of the short-circuit elements 25, measured in the direction of rotation, is approximately equal to the width, measured in the direction of rotation, of the stator yokes 24, while the width of the teeth 22 on the rotor rings 16, 17, measured in the direction of rotation, is less than the pole pitch τ.

Figure 2:
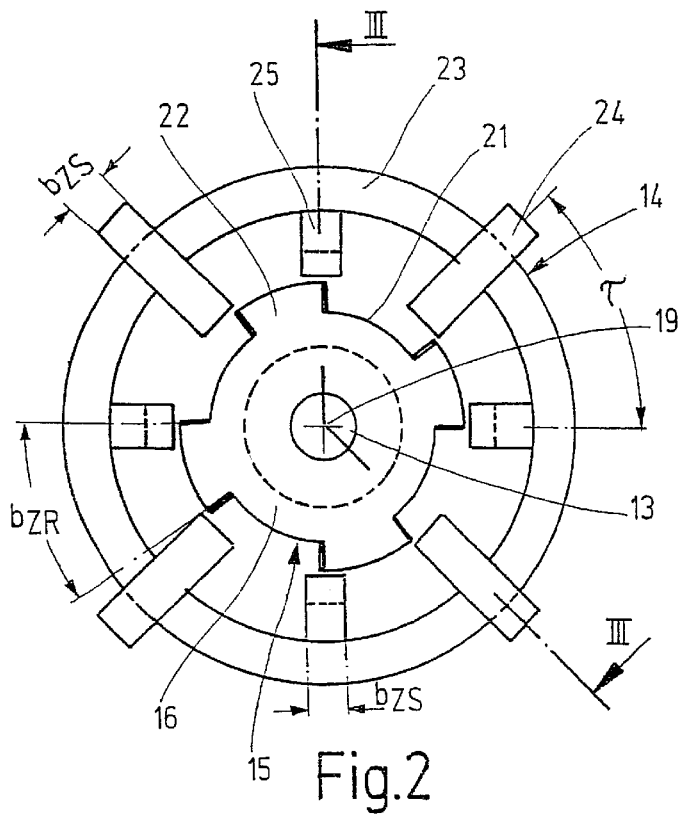
FIG. 2, a schematic plan view on a module unit of an 8-pole unipolar transverse flux machine.

As can be seen from FIG. 2, the width of the teeth 22 on the rotor rings 16, 17, also designated as the rotor tooth width $b_{ZR}$, is dimensioned as substantially greater in comparison to the width, or stator tooth width $b_{ZS}$, of the stator yokes 24 and short-circuit elements 25, specifically in such a way that the ratio of the rotor tooth width $b_{ZR}$ to the stator tooth width $b_{ZS}$ is greater than 1 and less than 2. The upper limit is preferably kept lower, and for example is chosen to be equal to or less than 1.5. Better machine performance can be attained, and the waviness of moment ripples can for instance be smoothed, if the stator yokes 24 and short-circuit elements 26 are not offset by exactly one pole pitch τ but instead if their spacing differs from the pole pitch τ.

In the exemplary embodiment of FIGS. 1–5, the short-circuit elements 25 are in the shape of a C, with two short legs 251, 252 each radially facing one rotor ring 16, 17, and a crossbar 253 joining the legs together, which extends parallel to the rotor axis 19 along the inside, toward the rotor axis 19, of the circularly embodied annular coil 23. As a result of this embodiment of the short-circuit elements 25 and stator yokes 24, the circular-annular coil 23 passes through the stator yokes 24 at the bottom of the leg and between the stator yokes extends along a respective short-circuit element 25. The axial width of the end face 254 of the legs 251, 252 is embodied here as identical to the axial width of the rotor rings 16, 17. However, the legs 251, 252 can also protrude axially past the rotor rings 16, 17.

Figure 4:
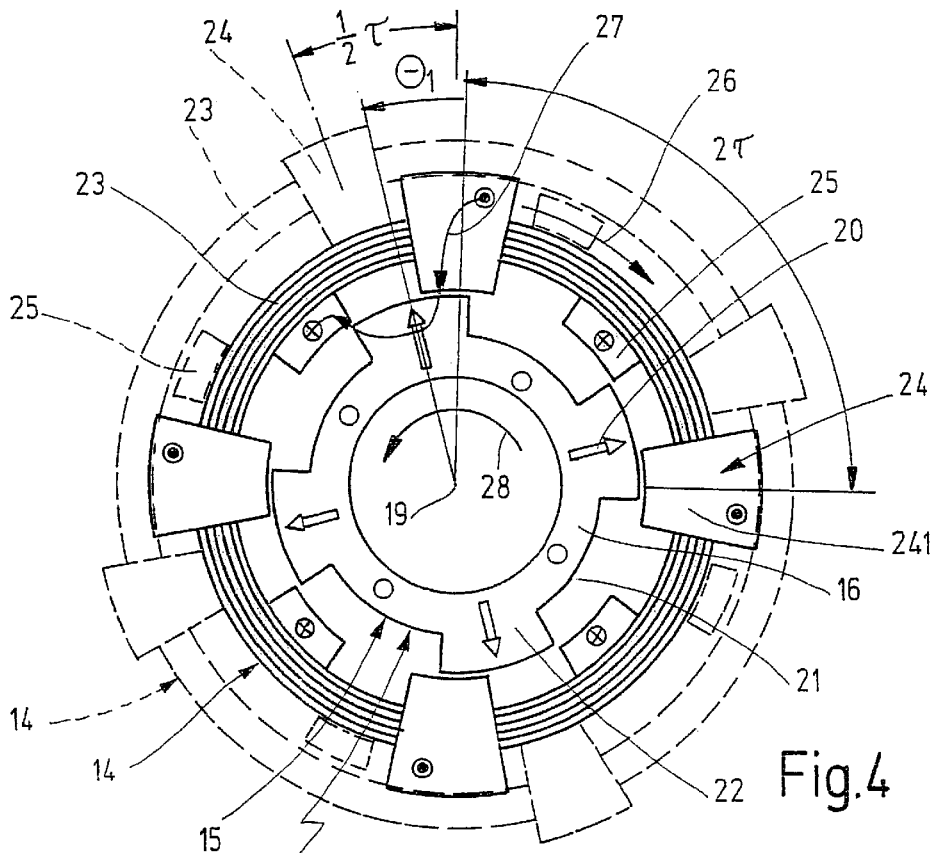
FIGS. 4 and 5, each, a schematic plan view of a two-lane, 8-pole unipolar transverse flux machine, in two different rotary positions of the rotor, for the sake of explaining the mode of operation.
Figure 5:
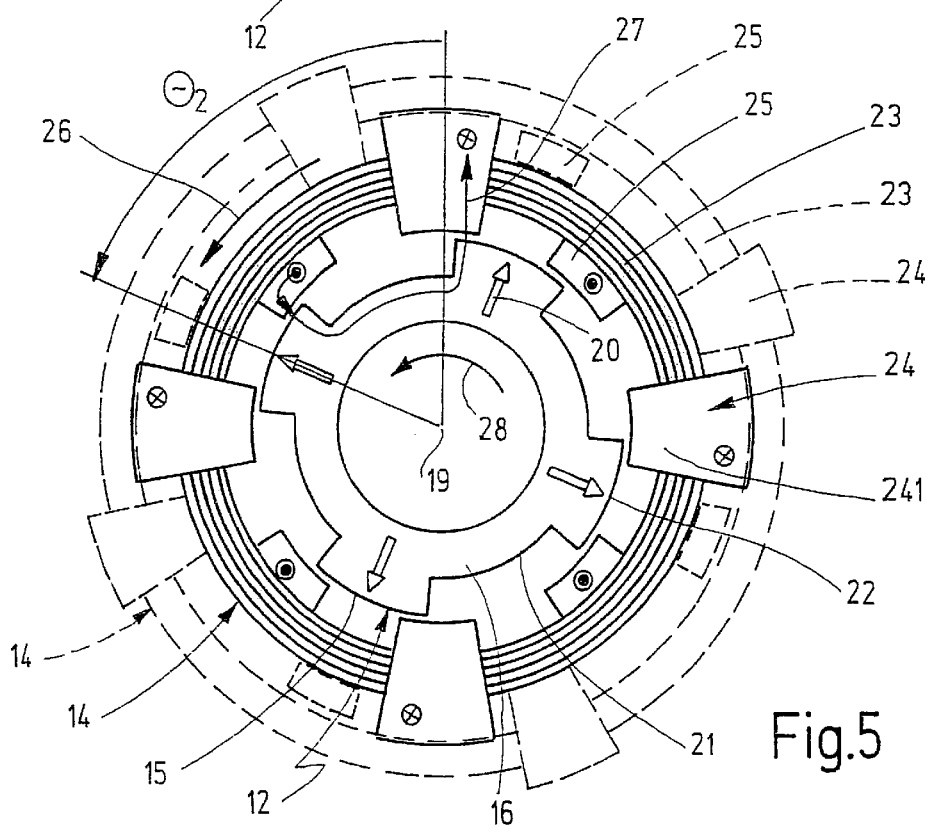

As shown in perspective in FIG. 1 and as sketched schematically in FIGS. 4 and 5, in the two-lane version of the unipolar transverse flux machine, the two rotor modules 15, seated axially side by side on the rotor shaft 13, of the two module units are oriented in alignment with one another, and the two stator modules 14, disposed axially side by side in the machine housing 10, of the two module units are rotated by 90° electrically from one another, which is equivalent to one-half of a pole pitch τ. In the 8-pole version of the machine shown in FIGS. 4 and 5, this offset is equivalent to a rotational angle of 22.5°, and in the 32-pole version of the machine shown in FIG. 1, it is equivalent to an offset angle of 5.625° in the direction of rotation. It is alternatively possible for the two stator modules 14 to be oriented in alignment with one another axially, and for the rotor modules 15 seated on the rotor shaft 13 to be rotated from one another by the aforementioned electrical angle of 90°.

The mode of operation of the machine, in its operating mode as a motor, will be explained below in conjunction with FIGS. 4–7. In FIGS. 4 and 5, the two-lane machine is shown schematically in plan view; the stator module 14 of the module unit that in the plan view is located behind the front module unit is shown with an enlarged diameter, in order to make it visible. The two rotor modules 15, seated on the rotor shaft 13 in a manner fixed against relative rotation and forming the rotor 12, of the module units are aligned with one another, so that only the rotor module 15 of the front module unit in the plan view can be seen. FIGS. 4 and 5 show the same view of the machine in two different rotary positions of the rotor 12. In FIG. 6, a graph is shown for the electrical current to the two annular coils 23 in the two stator modules 14, as a function of the rotary position Θ of the rotor 12. Each annular coil 23 is supplied with current in bipolar fashion; that is, it is acted upon by a positive and a negative current pulse in alternation, for example with the same amplitude, and the current pulses in the two annular coils 23 of the stator modules 14 are phase-displaced by 90° from one another.

In FIG. 4, the annular coil 23 is subjected to a positive current pulse, at a rotary position of the rotor 12 at a rotational angle $\Theta_1$. The instantaneous current direction in the annular coil 23 is represented in FIG. 4 by the arrow 26 associated with the annular coil 23. This current generates a stator flux along the stator yokes 24, the teeth 22 of the rotor rings 16, 17, and the short-circuit elements 25, as is indicated in FIG. 4 by arrow 27 for one stator yoke 24, one tooth 22, and one short-circuit element 25. The stator flux 27 extends radially in one leg 241 of the yoke to the tooth 22 facing it and closes the circuit via the short-circuit element 25, the second leg 242 of the yoke, and the crossbar 243 (not visible here) of the stator yoke 24. The magnetic flux 20, which as FIG. 3 shows is oriented radially outward in the rotor ring 16 and radially inward in the rotor ring 17, is represented in FIGS. 4 and 5 by arrows 20. From the course of the flux shown, it can be seen clearly that the magnetic flux 20 is counter to the stator flux 27 in the region of the stator yokes 24 and is in the same direction in the region of the short-circuit elements 25. Accordingly, the teeth 22 are repelled by the stator yokes 24 and attracted by the short-circuit elements 25, causing the rotor 12 to rotate by one angular increment in the direction of the arrow 27. In the event of equal current supply, phase-displaced by 90°, of the annular coil 23 in the second stator module 14, the same process takes place, and the rotor 12 is rotated by an equal rotational angle, so that it has now rotated by a total rotational angle $\Theta_2$ (FIG. 5) The current direction of the current pulse in the annular coil 23 is now inverted, which is represented by the arrow 26, associated with the annular coil 23, in FIG. 5. If the magnetic flux 20 is unchanged, the stator flux changes in the manner indicated by arrow 27 in FIG. 5. As a consequence, the teeth 22 of the rotor 12 are attracted by the stator yokes 24 and repelled by the short-circuit elements 25, and the rotor 12 moves onward in the same rotational direction 28. Phase-displaced by 90°, the current pulses delivered to the annular coil 23 in the second stator module 14 are then inverted, and the same process takes place again. As the current-supply pattern for the two stator modules 14 in FIG. 6 shows, the process described continues over the entire rotational angle $\Theta$ of 360° of the rotor 12, and thus the rotor 12 revolves.

In FIG. 7, the torques occurring at the rotor shaft 13 are plotted over the rotational angle $\Theta$ of the rotor 12. The upper two graphs show the course of the torques that are furnished proportionally by each of the two module units. The lower graph in FIG. 7 shows the total torque that can be picked up at the rotor shaft 13 and that results from the addition of the individual moments generated by the two module units. As can be seen from FIG. 7, the torque M fluctuates along the rotational angle $\Theta$, so that the course of torque has an undesired ripple. This ripple can be made less perceptible if the number of poles in the machine is increased on the one hand and the number of module units of the machine and thus the number of lanes is increased on the other. From an electrical and production standpoint, the 32-pole version of the machine shown in FIG. 1 has proved favorable.

The two-lane machine described in the exemplary embodiment can be embodied with more than two lanes as well. If the number m of lanes and thus the number of spatially parallel-disposed module units, with identical rotor modules 15 seated on a common rotor shaft 13, is an integer greater than 2, then the stator modules 14 disposed axially in succession on the stator 11 must be displaced relative to one another by an electrical angle of 360°/m, or in other words 120° electrically for a three-lane machine with three module units.

Figure 8:
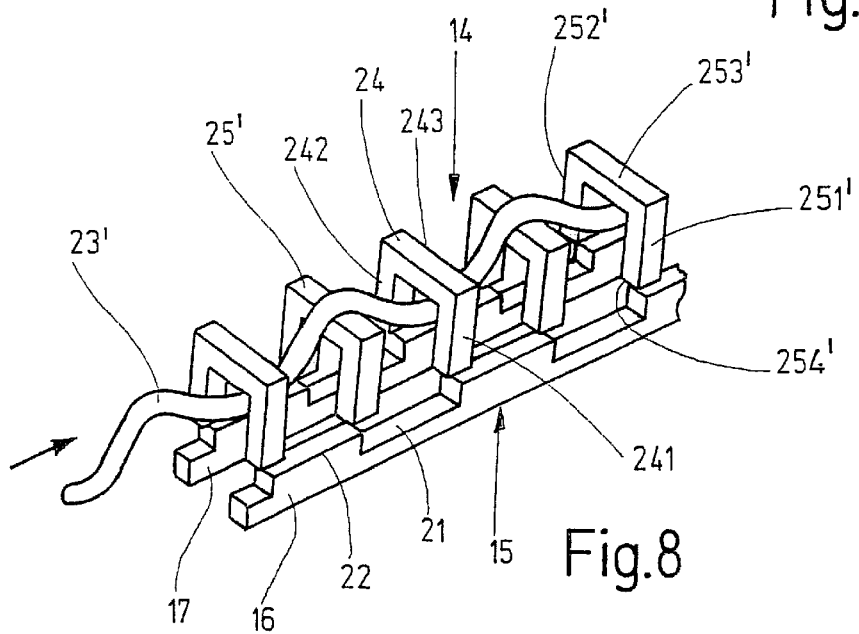
FIG. 8, a fragmentary perspective developed view of a module unit with a modified stator winding.

In the exemplary embodiments of the unipolar transverse flux machine of FIGS. 1–5, the annular coil 23 is embodied circularly and is disposed concentrically to the rotor axis 19. This requires that the stator yokes 24 and short-circuit elements 25 be embodied differently from one another geometrically. In an alternative embodiment of a module unit, of the kind shown in fragmentary perspective in the form of a developed view in FIG. 8, the short-circuit elements 25' are embodied identically to the stator yokes 24. The stator yokes 24 here are shown only schematically and are not adapted in their proportions to the proportions of the teeth 22 of the rotor rings 16, 17 as was the case in FIGS. 4 and 5, for example. Like the stator yokes 24, the short-circuit elements 25' have a U shape, each with two long legs 251' and 252' radially facing a respective rotor ring 16 and 17, and with one crossbar 253' joining the legs together and extending parallel to the rotor axis 19. The annular coil 23', which to generate the stator flux must move on the one hand through the stator yokes 24 and on the other be extended along the crossbars 253' of the short-circuit elements 25', is accordingly shaped in meandering fashion in the radial plane point-symmetrically to the rotor axis 19, so that on the one hand it extends on the inside, oriented toward the rotor axis 19, of the crossbars 243 of the stator yokes 24 and on the other on the outside, remote from the rotor axis 19, of the crossbars 253' of the short-circuit elements 25'.

Each of the stator modules 14 described above is embodied as a self-supporting construction and to that end is received in a housing 30 that comprises two half shells 31, 32. The two half shells 31, 32 are embodied identically and are placed in mirror symmetry on one another, as can be seen from the exploded view in FIG. 9. Each half shell 31, 32 has a gridlike structure, with an inner ring 33 and an outer ring 34 concentric to it, these rings being embodied integrally with one another by means of radial ribs 35. In the half shells 31, 32, radial grooves 36 for receiving the stator yokes 24 are embodied on the one hand, extending over the inner ring 33, radial rib 35 and outer ring 34, and radial grooves 37 on the other are embodied for insertion of the short-circuit elements 25; the radial grooves extending over only the inner ring 33. The total number of radial grooves 36, 37 equals the number of stator elements (that is, stator yokes and short-circuit elements), and in the exemplary embodiment of FIG. 9, for a 32-pole unipolar transverse flux machine, it is thirty-two. The number of radial grooves 36, 37 is adapted to the thickness of the stator yokes 24 and short-circuit elements 25, and the axial depth of the radial grooves 36, 37 is made slightly greater than half the axial width of the stator yokes 24 or short-circuit elements 25. Besides these radial grooves 36, 37, the two half shells 31, 32 placed on one another have indentations 39, facing one another in mirror symmetry and disposed concentrically to the housing axis 38, for receiving the annular coil 23 of the stator module 14 (FIG. 1). The indentations 39 are made in the radial ribs 35, so that the annular coil 23, which is not shown in FIG. 8, extends along the air throughput openings 40 that are enclosed by the inner ring 33, outer ring 34 and radial ribs 35, through which openings an optimal heat dissipation from the annular coil 23 and the stator yokes 24 and short-circuit elements 25 is assured.

The stator yokes 24 and the radial grooves 36 are adapted to one another in such a way that when the stator yokes 24 and short-circuit elements 25 have been inserted into the radial grooves 36 and 37, the two half shells 31, 32 of the housing 30 are fixed nondisplaceably both radially and axially. To that end, compared to the exemplary embodiments of FIGS. 1–3, the stator yokes 24 have been modified and—as can be seen for one stator yoke 24 in plan view in FIG. 10 and in the inserted position in the housing 30 in FIG. 9—each have a respective hook 41 which has a hook root 411 and protrudes on both sides of the crossbar 243, and also a respective gripping tab 412 extending parallel to the legs 251, 252 of the yoke, which tab, when the stator yoke 24 has been inserted into the radial groove 36 (FIG. 9) fits by positive engagement over a radial rib 35 in the two half shells 31, 32, on the back side of the radial rib remote from the radial groove 36. To that end, one radial recess 42 is made in the groove bottom of each radial groove 36, on the end located in the outer ring 34, for receiving the stator yokes; the radial depth of the radial recess is dimensioned such that when the stator yoke 24 has been inserted in the correct position into the radial groove 36, the root 411 of the hook 41, with its lower edge pointing toward the inner ring 33, strikes the bottom of the recess 42. Thus on the one hand the stator yokes 24 are positioned with precise tolerance in the radial direction, and on the other, with the gripping tabs 412 of their hooks 41, they clamp the two half shells 31, 32 together.

To assure automatic starting of the unipolar transverse flux machine, the machine is embodied with at least two lanes, as shown in FIG. 1. Each stator module 14 is received in the above-described housing 30, and the two housings are placed axially against one another, rotated by 90° electrically. In the 32-pole version of the unipolar transverse flux machine, the rotary offset is equivalent to a rotational angle of 5.625° spatially. To assure this rotary offset of the housing 30 to precise tolerances, two spaced-apart, identical radial recesses 43, 44 are made, from the outside of the respective half shell 31 and 32 remote from the radial grooves 36, 37, in the annular portions 341, extending between the radial ribs 35 and defining the air throughput openings 40 toward the outside, of the outer ring 34 of each shell 31 and 32. The width of the radial recesses 43, 44 is equal to the width of the hooks 41 protruding from the stator yokes 24 on both sides, and their radial depth is equal to the axial length of the hooks 41. The spacing, viewed in the circumferential direction of the radial recess 43 from the next radial groove 36 in the circumferential direction of the housing 30 for one stator yoke 24, and the equal spacing of the radial recess 44 from the preceding radial groove 36 for one stator yoke 24, are equal to the angle by which the two stator modules 14 must be rotated relative to one another, in the two-lane version of the unipolar transverse flux machine. In the two-lane version, the aforementioned spacing is 90° electrically, or in other words 5.625° spatially for the 32-pole machine. In a multi-lane machine, this rotational angle offset amounts to 360°/m, where m is the number of stator modules 14 placed against one another and is greater than 2. For half shells 31, 32 resting on one another, the hooks 41 engage the radial recesses 43 or 44 of the adjacent half shell of the housing 30 from the next stator module 14, so that both stator modules 14 are positioned precisely in the circumferential direction.

Figure 9:
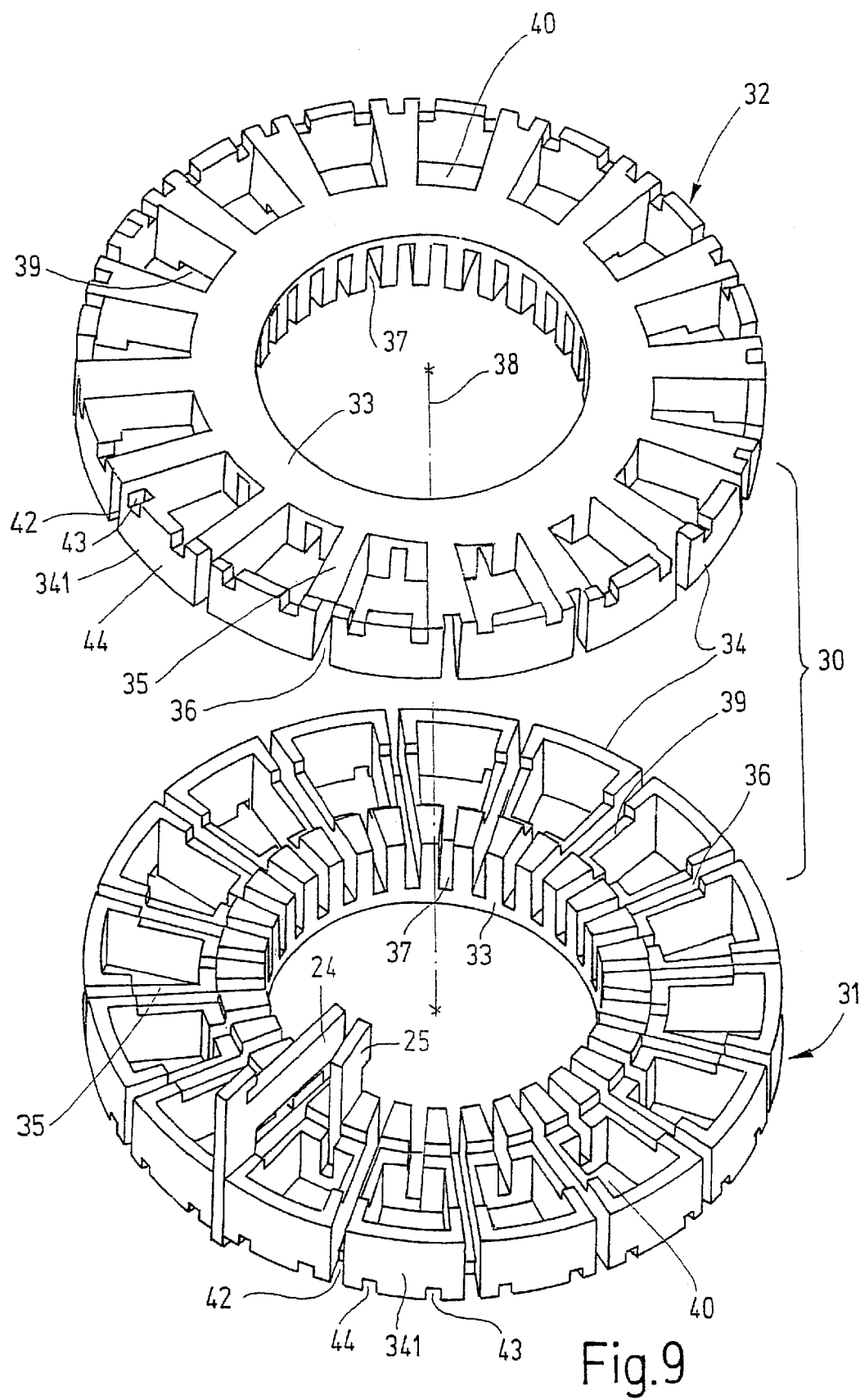
FIG. 9, a perspective exploded view of a housing that receives a stator module, for a single-lane, 32-pole unipolar transverse flux machine.
Figure 10:
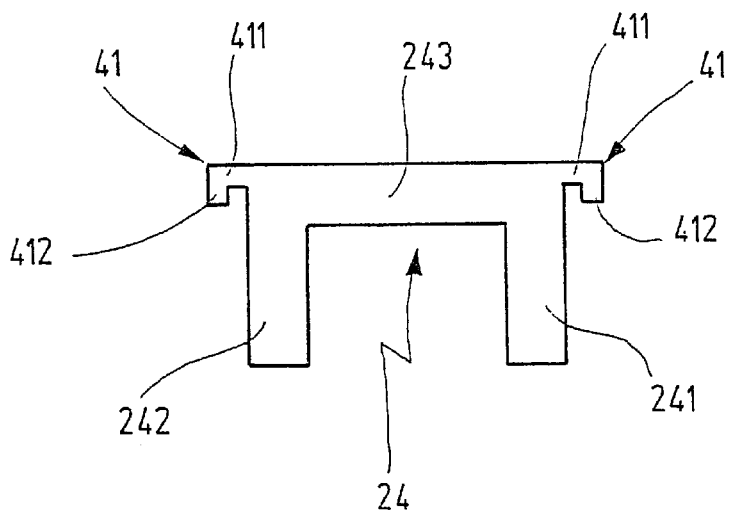
FIG. 10, a plan view on a stator yoke for use in the housing of FIG. 9.

Mounting the stator module 14 in the housing 30 is done by joining technology, as follows:

First, in one half shell 31, all the radial grooves 37 in the inner ring 33 are equipped with the short-circuit elements 25, as shown in FIG. 9 for one short-circuit element in the lower half shell 31. Next, the annular coil 23 (FIG. 1) is placed in the indentations 39, which are aligned in the circumferential direction, in the radial ribs 35. Then the other half shell 32 is placed on the preassembled half shell 31, and the short-circuit elements 25 protruding axially out of the half shell 31 penetrate the radial grooves 37 of the half shell 32. Then, from the outside, the stator yokes 24 are thrust into the radial grooves 36, until the roots 411 of the protruding hooks 41 strike the bottom of the recesses 42; at the same time, the gripping tabs 42 fit over the back sides of the radial ribs 35 and thus clamp the two half shells 31, 32 together in the axial direction. The position of the stator yokes 24 in the two half shells 31, 32 is shown in FIG. 9 for one stator yoke 24 in the lower half shell 31.

Figure 12:
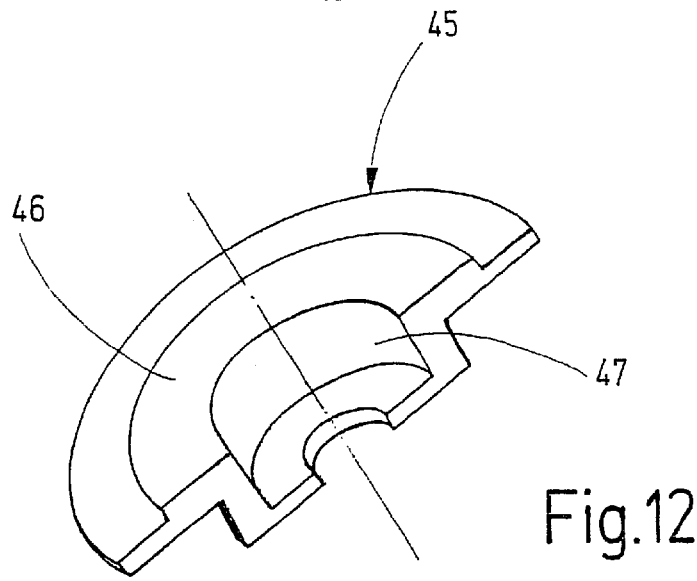
FIG. 12, a fragmentary plan view of a bearing plate, to be secured to the housing, for rotational support of the rotor shaft.

In the multi-lane version of the unipolar transverse flux machine, a second stator module 14, joined in the same way, is placed with its housing 30 against the first housing 30; the hooks 41 of the stator yokes 24—as described above—engage one of the radial recesses 43 or 44 of the second housing 30 and assure the rotation of the stator modules 14 by 90° electrically from one another. One bearing plate 45 for receiving the rotor shaft 13 is secured to each of the two outer half shells 31, 32 of the total of four half shells 31, 32. Half of the bearing plate 45 can be seen in perspective in FIG. 12. Two such bearing plate halves 45 are secured by one flange part 46 to the inner ring 33 of the respective half shell 31 and 32. A bearing prop 47 protruding perpendicularly from the flange part 46 receives the rotary bearing for the rotor shaft 13 (FIG. 1).

Figure 11:
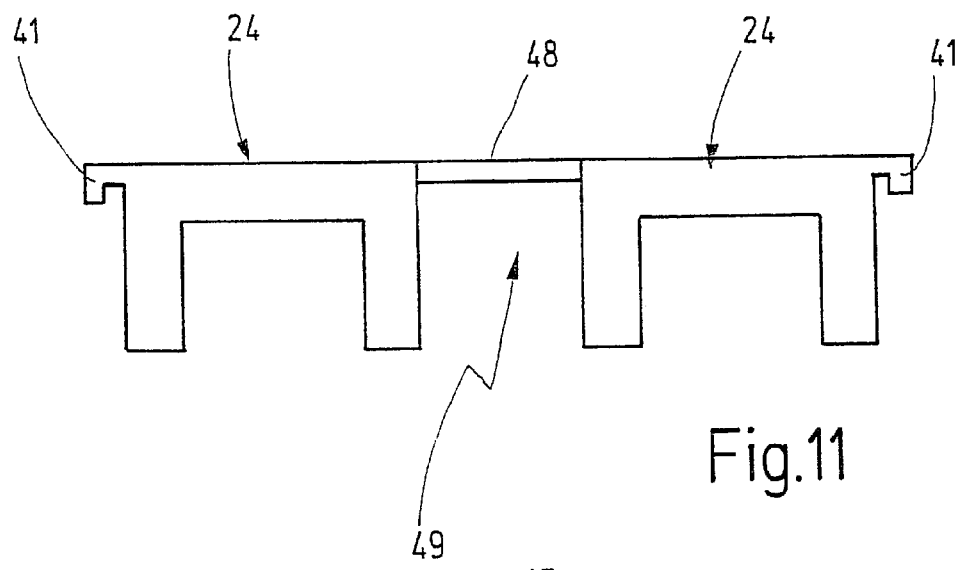
FIG. 11, a plan view of two joined-together, axially aligned stator yokes for a two-lane unipolar transverse flux machine.

As already mentioned above, a multi-lane version of the unipolar transverse flux machine can also be realized in such a way that the stator modules 14, disposed fixedly side by side, are oriented in axial alignment, and the rotor modules 15 are disposed rotated by a fixed angle from one another on the rotor shaft 13. In that case, the possibility is afforded of connecting the stator yokes 24, of the stator modules 14 located side by side in the axial direction, together in their crossbar region by means of axially extending bridges 48, as is shown for a two-lane version in FIG. 11. The stator yokes 24 with a bridge 48 are embodied as one-piece stamped parts 49. Once again, one protruding hook 41 is disposed on each of the outsides, facing away from one another, of the stator yokes 24. The stamped parts 49, after being preassembled, are placed in the aligned radial grooves 36 in the four half shells 31, 32; the bridges 48 rest in the radial recesses 42 in the two half shells 31, 32 that are resting on one another, and the protruding hooks 41 each fit over the respective radial ribs 35 of the two outer half shells 31, 32, on their back side remote from the radial grooves 36.

Figure 13:
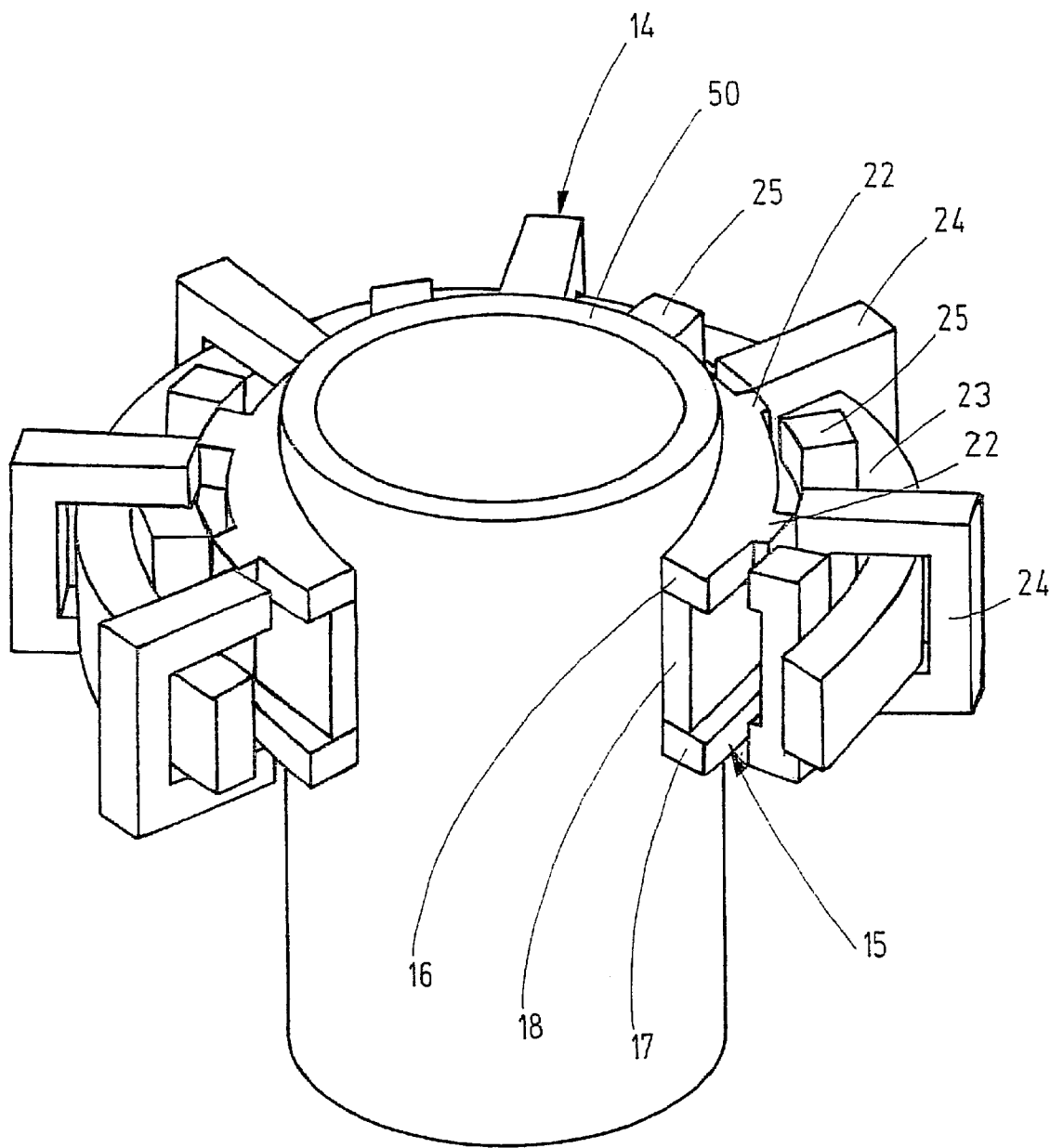
FIG. 13, a simplified fragmentary view of a module unit of a 16-pole unipolar transverse flux machine embodied in a hollow-shaft version.

In FIG. 13, a module unit for a 16-pole unipolar transverse flux machine embodied as a hollow-shaft version is shown. The module unit again comprises one stator module 14 and one rotor module 15, both constructed as described above, so that in FIG. 13, identical components are provided with the same reference numerals as before. In the exemplary embodiment of FIG. 13, the rotor module 15 is seated in a manner fixed against relative rotation on a hollow shaft 50. The complete unipolar transverse flux machine is embodied in two lanes, as in FIG. 1, and accordingly has two module units, with two stator modules 14 and two rotor modules 15, the rotor modules being disposed side by side on the hollow shaft 50; the stator module 14 or the rotor module 15 of the second module unit is again rotated by 90° electrically compared to the first module unit.

This kind of hollow-shaft version of the unipolar transverse flux machine is especially advantageously well suited as a drive motor for an electromechanical wheel brake, of the kind described for instance in International Patent Disclosure WO 96/00301. The rotation-to-translation conversion gear driven by the drive motor is then accommodated in the interior of the hollow shaft 50, so that an extremely small structural form of the wheel brake is achieved.

It is understood that it is possible to embody the unipolar transverse flux machine of the exemplary embodiment in FIG. 13 with multiple lanes, for instance three lanes, but the two-lane version offers the greater advantages in terms of the space required to accommodate the electromechanical wheel brake.

What is claimed is:

1. A unipolar transverse flux machine, comprising a housing; a rotor rotatable about a rotor axis, said rotor having at least one rotor module assembled from two coaxial ferromagnetic rotor rings toothed with a constant tooth pitch and one permanent-magnet ring fastened between said rotor rings and magnetized unipolarly in a direction of said rotor axis; a stator which is concentric with said rotor axis and having at least one stator module associated with said rotor module and including an annular coil disposed coaxially to said rotor axis and U-shaped stator yokes fitting over said annular coil and fixed with a pitch corresponding to a tooth pitch of said housing, said rotor rings having a toothing provided solely on an outer circumference of said rotor rings remote from said rotor axis, said stator yokes in said stator module being disposed such that one leg of each of said stator yokes is located facing one of said rotor rings and another leg of each of said stator yokes is located facing another of said rotor rings the stator legs are facing the respective rotor rings with a radial gap spacing; and one short-circuit element each disposed between successive ones of said stator yokes in a direction of rotation of said rotor and extending axially over both said rotor rings and facing said rotor rings with a radial gap spacing.

2. A unipolar transverse flux machine as defined in claim 1, wherein said rotor has two said identical rotor modules and said stator has two said identical stator modules, said stator modules being firmly seated axially side-by-side in said housing and said rotor modules being firmly seated axially side-by-side on a rotor shaft, in a mutual relationship such that said modules and said stator modules of said rotor modules are each rotated electrically from one another by 90 electrical degrees.

3. A unipolar transverse flux machine as defined in claim 1, wherein said rotor has n rotor modules and said stator has m stator modules, said stator modules being firmly seated axially side-by-side in said housing and said rotor housing being firmly seated axially side-by-side on a rotor shaft each in a mutual relationship such that said modules of said stator modules and said rotor modules are each rotated electrically from one another by 360/m electrical degrees, wherein m is an integer and is greater than 2.

4. A unipolar transverse flux machine as defined in claim 1, wherein said stator yokes, said short-circuit elements and said rotor rings are laminated.

5. A unipolar transverse flux machine as defined in claim 1, wherein said short-circuit elements are disposed with an offset of one pole pitch from said stator yokes.

6. A unipolar transverse flux machine as defined in claim 1, wherein said radial gaps spacing between said stator yokes and said rotor rings is equal to the radial gap spacing between short-circuit elements and said rotor rings.

7. A unipolar transverse flux machine as defined in claim 1, wherein each respective free end lace of the respective leg of said stator yokes has at least same axial width as said rotor rings, and said free end face protruding past said rotor rings on one or born sides thereof.

8. A unipolar transverse flux machine as defined in claim 1, wherein a width of said short-circuit elements measured in the direction of rotation is approximately equal.

9. A unipolar transverse flux machine as defined in claim 1, wherein a ratio of a tooth width of the teeth on said rotor rings to a width of said stator yokes and said short circuit elements, each viewed in the direction of rotation is selected to be greater than 1 and less than 2.

10. A unipolar transverse flux machine as defined in claim 1, wherein said short-circuit elements are in form of a C-shape, each C-shape having two short legs each radially facing a respective rotor rings and one crossbar connecting said legs of said C-shap to one another, said cross bar extending parallel to said rotor axis and opposes an inner peripheral side of an annular coil of a circular shape.

11. A unipolar transverse flux machine as defined in claim 1, wherein said short-circuit elements am in form of a U-shape each with two long legs radially facing respective rotor rings and having one cross bar connecting said long legs and said cross bar extending parallel to said rotor axis; and further comprising an annular coil of said stator module which is shaped in meandering fashion, point-symmetrically to said rotor axis in a radial plane, in such a way that in successive alternation said annular coil extends through a space between said legs of said stator yoke and beyond an outside region remote from said rotor axis of a crossbar of said short-circuit element.

12. A unipolar transverse flux machine as defined in claim 1, wherein said stator yokes and said short-circuit elements are embodied identically in size and shape.

13. A unipolar transverse flux machine as defined in claim 12, wherein respective free end faces of said legs of said short-circuit elements have at least a same axial width as said rotor rings, said respective free ends faces protruding past said respective rotor rings on one or both sides.

14. A unipolar transverse flux machine as defined in claim 1, wherein said stator has m number of plural stator modules, said stator modules being supplied with current in current pulses bipolarly as a function of a rotational angle of said rotor, said current pulses in said stator modules, wherein one of two conditions occur when m is equal 2, there are two stator modules are being faced-displaced by 90 electrical degrees from one another, and when M is greater than 2, said m number of said stator modules are being phase-displaced from one another by 360/m electrical degrees.

15. A unipolar transverse flux machine as defined in claim 1, wherein each of said stator modules is received in said housing, said housing comprising two half shells which are embodied identically in size and shape and placed on one another mirror-symmetrically and having axially aligned radial grooves for insertion of said stator yokes and said short-circuit elements and also having indentations for receiving an annular coil, that face one another mirror-symmetrically and are oriented concentrically to an axis of said housing.

16. A unipolar transverse flux machine as defined in claim 15, wherein each of said half shells has a grid-shaped structure with an inner ring and an outer ring concentric to one another and integrally joined to one another by radial ribs, said inner ring having radial grooves that receive said short-circuit elements and said stator yokes have radial grooves extending across said inner ring, a radial rib and said outer ring.

17. A unipolar transverse flux machine as defined in claim 16, wherein radial ribs have indentations for an annular coil.

18. A unipolar transverse flux machine as defined in claim 16, wherein said stator yokes and said radial grooves which receive said stator yokes are adapted to one another such that when said stator yokes and said short-circuit elements are inserted in said radial grooves said two half shells are fixed against one another radially and axially nondisplaceably.

19. A unipolar transverse flux machine as defined in claim 18, wherein said radial grooves have a width adapted to a thickness of said stator yokes and said short-circuit elements, said radial grooves having an axial depth which is dimensioned as slightly larger than halt an axial width of said stator yokes and said short-circuit elements.

20. A unipolar transverse flux machine as defined in claim 18, wherein said stator yokes have respective crossbars and a respective protruding hook on both sides of each of said respective crossbars such that when said stator yokes are inserted in said radial grooves said hook fits by positive engagement over said radial rib of said two half shells on a back side remote from said radial groove.

21. A unipolar transverse flux machine as defined in claim 20, wherein the machine is configured as an axial multi-lane structure, wherein said rotor modules are disposed in axial alignment on a rotor shaft and said stator modules are rotated by a fixed angle relative to one another, and wherein two spaced-apart radial recesses are inserted from an outside of said half shell and remote from said radial grooves into annular portions of said outer ring that extends between said radial ribs, said recesses having in a circumferential direction a width corresponding to a width of said hooks that protrude from said stator yokes, said radial recesses having a radial depth corresponding to an axial length of said hooks, one of said radial recesses being disposed offset by a fixed rotational angle from a next one of said radial grooves in succession for a stator yoke, and another of said radial recesses being disposed offset by a same fixed angle from a preceding radial groove for said stator yoke.

22. A unipolar transverse flux machine as defined in claim 18, wherein the machine is configured as an axial multi-lane structure, wherein said stator modules am axially aligned and said rotor modules are disposed rotated relative to one another by a fixed angle on a rotor shaft, said stator yokes of said stator modules being located side-by-side in an axial direction and joined together in a crossbar region by axially extending bridges, said stator yokes being joined together and having on an outer side two outer stator yokes each having one hook protruding from a crossbar, said hook, when said stator yokes are inserted in said radial grooves, fitting over a radial rib of one of said two outer half shells on a back side remote from said radial groove.

23. A unipolar transverse flux machine as defined in claim 22, wherein said stator yokes joined together via said bridges are formed as one-piece stamped pads.

24. A unipolar transverse flux machine as defined in claim 20, wherein each of said radial grooves on an end located in said outer ring has a radial recess provided in a groove bottom, said radial recess having a radial depth which is dimensioned such that when said stator yoke is inserted in a correct position into said radial groove, a root of said hook protruding from said cross bar strikes a bottom of said recess with a lower edge pointing toward said inner ring.

25. A unipolar transverse flux machine as defined in claim 15; and further comprising two bearing plates provided for a rotational support of said rotor shaft and placed on two outer halt shells, said plates being secured to said half shells with a flange part and receiving said rotor shaft in a bearing prop protruding from said flange part.

26. A unipolar transverse flux machine as defined in claim 1, wherein at least one of said rotor modules is disposed on a hollow shaft so as to be fixed against relative rotation.

* * * * *